United States Patent
Makram-Ebeid (10) Patent No.: US 6,466,700 B1
(45) Date of Patent: Oct. 15, 2002

(54) METHOD OF PROCESSING A NOISY MULTIDIMENSIONAL IMAGE AND MEDICAL IMAGING APPARATUS FOR CARRYING OUT THIS METHOD

(75) Inventor: Shérif Makram-Ebeid, Dampierre (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/222,399

(22) Filed: Dec. 29, 1998

(30) Foreign Application Priority Data

Dec. 31, 1997 (FR) .......................................... 97 16763

(51) Int. Cl.[7] .......................................... G06F 15/00
(52) U.S. Cl. ...................................... 382/265; 382/266
(58) Field of Search ............................... 382/260–269; 358/458

(56) References Cited

U.S. PATENT DOCUMENTS 5,673,207 A * 9/1997 Nomura ..................... 364/516
6,072,496 A * 6/2000 Guenter et al. ............. 345/419

FOREIGN PATENT DOCUMENTS

EP    p 927 953 A1 * 7/1999 ............. G06T/5/00

* cited by examiner

Primary Examiner—Thomas D. Lee
Assistant Examiner—Stephen Brinich
(74) Attorney, Agent, or Firm—John Vodopia (57) ABSTRACT

The invention relates to an image processing method for preserving the edges of objects reproduced in an intensity image and for reducing the noise, including the steps of acquisition of the intensity image in the form of a multidimensional matrix of points (2-D, 3-D), determination of the intensity gradient at each point, defined by its direction (($\theta_p$) and its modulus ($\|\vec{G}_p\|$), and the passage at each point of a recursive spatial filter having an anisotropic kernel and providing a degree of smoothing which is greater in the direction perpendicular to the direction of the gradient than in the direction of the intensity gradient. The kernel is spherical on the scanning lines which are not normal to the intensity gradient and it is shaped as a flattened sphere whose major dimension extends in the direction of lines normal to the intensity gradient in a scanned point. The invention also relates to a medical X-ray imagine apparatus for carrying out this method.

13 Claims, 9 Drawing Sheets

METHOD OF PROCESSING A NOISY MULTIDIMENSIONAL IMAGE AND MEDICAL IMAGING APPARATUS FOR CARRYING OUT THIS METHOD

FIELD OF THE INVENTION

The invention relates to an image processing method for reducing the noise while preserving the edges of objects reproduced in an intensity image, which method includes a step for the acquisition of the intensity image in the form of a multidimensional matrix of points The invention also relates to a medical imaging apparatus which includes a system for carrying out this method.

Points in a multidimensional matrix are to be understood to mean pixels in the case of a two-dimensional image and voxels in the case of a three-dimensional image.

The invention can be used notably in medical X-ray systems producing multidimensional images.

BACKGROUND OF THE INVENTION

A method of reducing the noise in a noisy digital image is already known from the publication "Image Processing: Flows under Min/Max Curvature and Mean Curvature" by R. Malladi et alii, in GRAPHIC MODELS AND IMAGE PROCESSING, Vol.58, No. 2, March, pp.127–141, 1996, ARTICLE No. 0011.

This document describes a class of algorithms which are suitable for reducing the noise in an image and for enhancing the contrast thereof. The method can be applied to noisy black and white images or color images. The method comprises two principal steps. First of all, a formulation of a set of grey levels or intensity levels is used to generate curves linking the pixels of the same intensity in the image; these curves are called isophotic lines. Secondly, means are used to smooth the irregularities of the curvature of the isophotic lines, thus reducing the noise and enhancing the images. The operation for smoothing the isophotic lines is carried out by reducing minima and maxima of curvature of the isophotic lines; this is called curvature commutation. The degrees of reduction of curvature are selected in a window so as to diminish the irregularities of the pattern of isophotic line within boundaries. As a result, the noise is reduced in this commutation window. This method is recommended according to the cited document first of all because it includes only one enhancement parameter which is automatically chosen in the majority of cases; secondly, it is recommended because it automatically stops the smoothing of a point in dependence on the dimensions of the commutation window.

Actually, this method is based on iterative steps An iterative step is started anew in a loop as many times as is necessary to obtain correct smoothing of isophotic lines. For a complex image, i.e. a non-geometrical image, and a three-dimensional image, that is to say an image consisting of, for example $128^3$ voxels, however, tests have shown that it is necessary to perform from 300 to 500 iterations which, according to the present state of the art, leads to calculation times of the order of 10 hours per image.

SUMMARY OF THE INVENTION

It is an object of the invention to provide a method for eliminating the noise, i.e. for smoothing a multidimensional complex image, which requires a much shorter calculation time, i.e. a method which requires only a small number of iterations.

This object is achieved by means of an image processing method for preserving the edges of objects reproduced in an intensity image and for reducing the noise by acquisition of the intensity image (2-D, 3-D) in the form of a multidimensional matrix of points, determination of the intensity gradient at each point, defined by its direction ($\theta_p$) and its modulus ($\|G_p\|$), and passage at each point of a recursive spatial filter having an anisotropic kernel and providing a degree of smoothing which is greater in the direction perpendicular to the direction to the gradient than in the direction of the intensity gradient;

An advantage of the method according to the invention resides in the fact that it is recursive, so that it can be carried out very economically in respect of calculations because each application of the filter to a point utilizes calculation elements which have already been performed. Thus, it can be executed -much faster than an iterative method. For example, using contemporary techniques the present method requires less than one minute for processing a volume of $128^3$ voxels. Therefore, it is much easier to carry out and approximately 1000 times faster than the known method.

Another advantage of the present method resides in the fact that it is adaptive, meaning that the filtering is automatically adapted to the type of structure encountered in each point. Thus, this method applies different filtering to the points of the background and the points of the object edges. The method thus enables smoothing of the image while preserving neat, non-shifted, non-distorted object edges wherefrom the noise has also been removed. This method is exact and powerful.

It is another advantage of the present method that it concerns a spatial filter. Thus, it does not require any data other than that of the single image processed; moreover, it is robust. Because it is very fast, it can also be used for the processing of a sequence of images.

Another advantage of the present method consists in the fact that it is fully automatic.

This method is carried out in an apparatus including a system for the acquisition of an intensity image in the form of a multidimensional matrix of points, and an image processing system which has access to the image data and to an image display and which includes a microprocessor for carrying out the image processing methods of the invention.

BRIEF DESCRIPTION OF THE DRAWINGS

The invention will be described in detail hereinafter with reference to the accompanying diagrammatic drawings; therein.

DESCRIPTION OF THE PREFERRED EMBODIMENTS METHOD

The Figures will be described in detail hereinafter in relation to the various steps of a fully automatic recursive method of processing a multidimensional noisy digital image in order to reduce the noise while very accurately preserving the small details and the edges of the objects represented in said image. The method aims particularly to perform thorough smoothing of the edges so as to enable the edges to be distinguished better from the background of the image. The method thus aims to apply a high degree of filtering in the directions of the edges of the objects and a lower degree of filtering in the directions perpendicular to said edges.

Small details are to be understood to mean herein object details having a dimension of the order of magnitude of a few pixels, for example a number of pixels smaller than or equal to 10. Multidimensional is to be understood to mean herein an image having two or three spatial dimensions and occasionally 1 supplementary temporal dimension if the image is animated.

The invention is used in particular for the processing of vascular images obtained by means of an X-ray apparatus operating in the fluoroscopy mode. In this mode the X-ray doses used to form the image are very low, so that the resultant image is very noisy. The vascular images represent objects such as arteries which are distinct from the background mainly by way of their edge lines, or very small vessels, such as those of the brain, and small tools such as a catheter which can be assimilated with an edge. Because of the noise in such images, these edges are rough and covered with small structures with an atypical curvature, thus hampering the use of these images by a radiologist wishing to visualize an operation performed on a patient in real time. The present method aims to eliminate these structures and roughnesses so as to reproduce the edges of the objects or the small objects in all clarity.

Figure 1A:
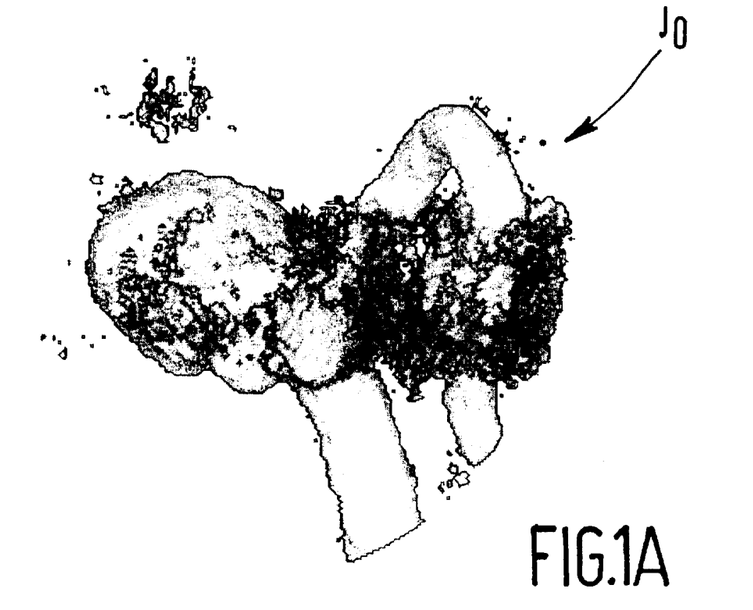
FIGS. 1A and 1B show a noisy and a filtered three-dimensional image, respectively.
Figure 1B:
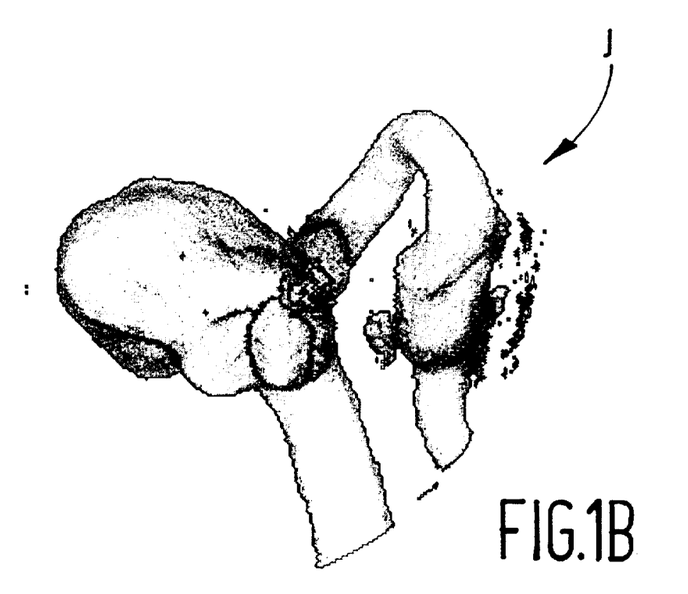

FIG. 1A shows, by way of example, a digital image $J_0$ in an application representing an artery in three dimensions (3-D). This image $J_0$, referred to as the original image, is very noisy. Tile noise notably forms patches which hamper a radiologist in suitably distinguishing the boundaries between the artery and the background. In the present example, this artery has a lateral dilatation which is called an aneurysm and whose significance is to be diagnosed by the radiologist or which is to be removed by surgery so as to avoid so-called rupture. In such a medical image it is very important to suppress the noise without suppressing details of the object so that the practitioner can ultimately operate the artery with a high precision i.e. to obturate the aneurysm without damaging the artery itself. FIG. 1B shows the image J in which the noise has been suppressed by means of the method of the invention and which corresponds to the noisy image $J_0$ of FIG. 1A.

In the above case it is important that the multidimensional image can be processed within a very short period of time in order to enable the practitioner to follow on line the occurrences in the region of the artery under the influence of surgical manipulations. This technique for following an operation by means of simultaneous display of an image, or a sequence of images, enables surgical activities to be performed in a non-invasive manner, that is to say without opening up the patient, by means of a catheter which is introduced into the arterial system of the patient and whose progression is tracked in an X-ray image in the fluoroscopy mode. This technique enables the treatment of aneurysms of the brain without taking recourse to trepanation which would be necessary so as to achieve direct vision of the zone to be operated. Numerous post-surgical problems are thus avoided.

It is equally important that the image can be processed by means of an automatic method. An automatic image processing method is to be understood to mean a method of forming a noise-suppressed image from a noisy image, without human intervention, by autonomous action of a system for carrying out the method.

Figure 2:
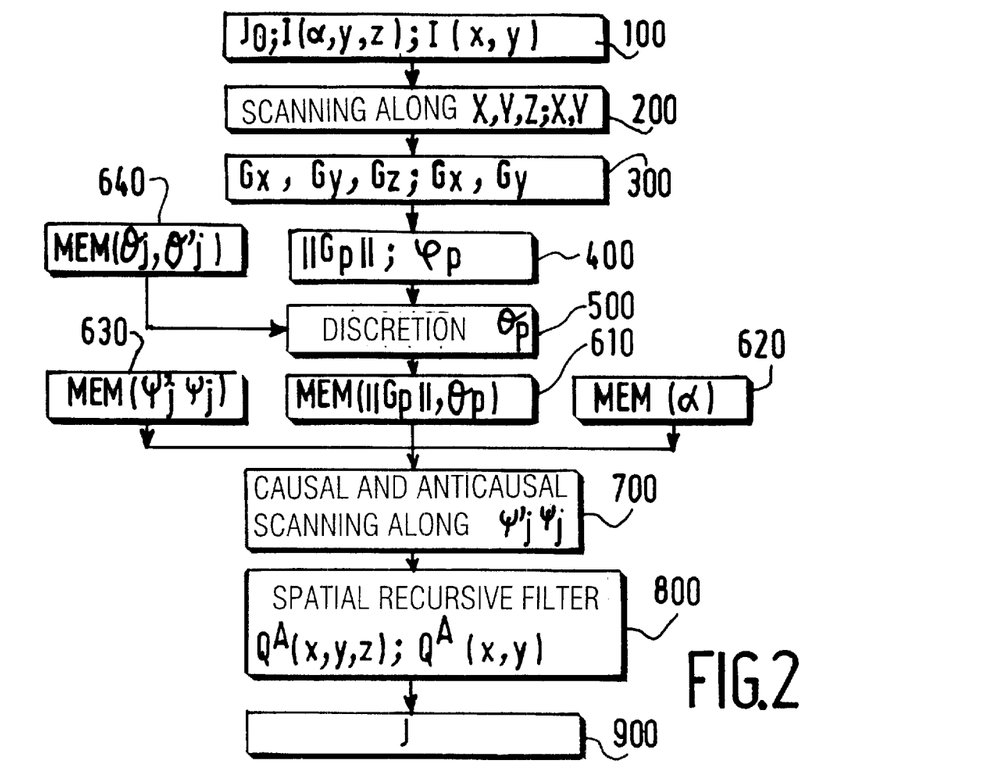
FIG. 2 shows blocks representing the steps of a method of filtering the noise in a three-dimensional or two-dimensional image.

The method according to the invention will be described in detail hereinafter for the processing of a three-dimensional image, 3-D, as well as for the processing of a two-dimensional image, 2-D. The volume elements of three-dimensional images are called voxels and the image elements of two-dimensional images are called pixels. Referring to FIG. 2, the method includes the following principal steps:

1) Acquisition of a Digital Image

In the 3-D case: A digital image $J_0$ is acquired by means 100 for forming a digital image in the form of a three-dimensional matrix of voxels P(x,y,z) which are characterized by their co-ordinates x,y,z in conformity with three co-ordinate axes X,Y,Z relating to the image, and by their digitized intensity I(x,y,z), which is, for example encoded in grey levels.

In the 2-D case: A digital image is acquired by the means 100 for forming a digital image in the form of a two-dimensional matrix of pixels P(x,y) which are characterized by their co-ordinates x,y in conformity with two co-ordinate axes X,Y relating to the image, and by their digitized intensity I(x,y) which is, for example encoded in grey levels.

2) Evaluation of Intensity Gradients

In the 3-D case: Intensity gradients are first determined by means 300 which perform calculations of first-order derivatives of the intensity function I(x,y,z) in the noisy 3-D image $J_0$, for example along orthogonal axes X,Y,Z in each current voxel P(x,y,z) to be processed.

In order to carry out this step automatically, preferably the image $J_0$ to be processed is subjected to systematic and automatic scanning 200, one voxel after the other, along scanning lines extending parallel to the axes X,Y,Z. In the course of such systematic and automatic scanning 200, the intensity I(x,y,z) of each voxel P(x,y,z) is subjected to filtering 300 by means of oriented filters which are known as "SOBEL" filters and are referred to hereinafter as $SOBEL_x$ for the axis X, $SOBEL_y$ for the axis Y, and $SOBEL_z$ for the axis Z. The implementation of SOBEL filters is described in a general textbook "Computer Vision" by Dana H. Balard and Christopher M. Brown, published by PRENTICE-HALL, Inc., Englewood Cliffs, N.J. US, 07632 p.77, lines 6–17, in relation to FIG. 3.10C.

As a result of the SOBEL filters an intensity gradient vector $\vec{G}_p$ can be determined in each current voxel P(x,y,z) of the three-dimensional image $J_0$ in a step 400, which intensity gradient vector is characterized by its modulus $\|\vec{G}_p\|$ and by the direction $\phi_p$ of its support marked in the orthonormalized system X, Y, Z.

Figure 4A:
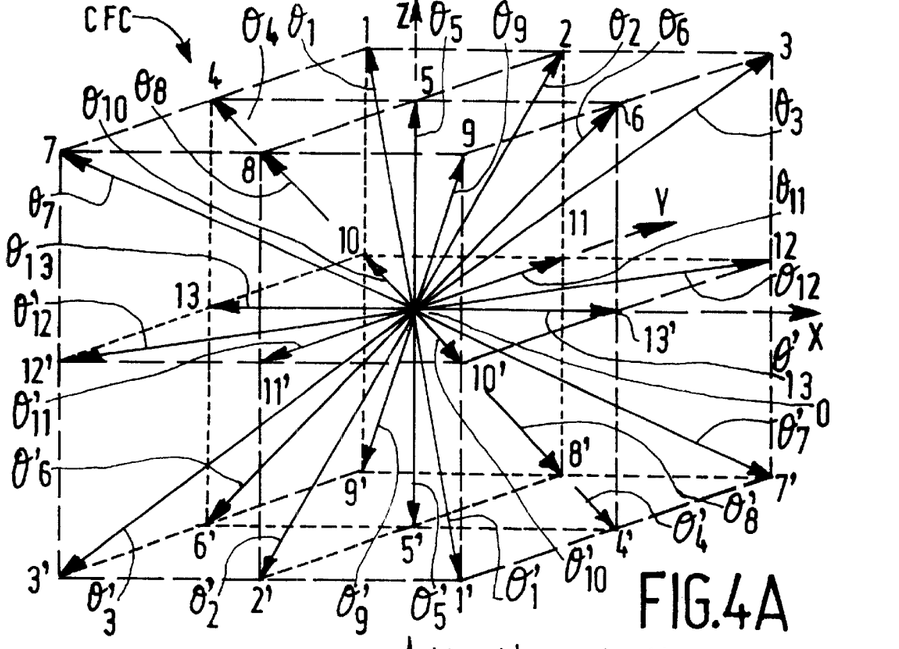
FIG. 4A shows the discretized orientations $\theta_i$ of the gradient vector for a three-dimensional image in a reference system.

According to FIG. 4A, a discretization 500 of the direction $\phi_p$ of the support of the gradient vector is subsequently performed in directions $\theta_p$. During the processing of the three-dimensional image, means 500 associate each direction $\phi_p$ of the gradient vector with a discretized direction $\theta_p$ which is fixed in a three-dimensional system CFC whose center 0 is arranged so as to coincide with the current voxel P(x,y,z) The system CFC is a system which is defined a priori and stored, for example in a memory 640. The system CFC forms a cubic system with centered faces and edges whose principal axes extend parallel to the axes X, Y, Z of the matrix of the image and has a symmetry around its center 0. In the system CFC 13 direct axes $\theta_p$ are defined which extend through the center 0 of the cubic system and through four vertices 1, 3, 7, 9 respectively, so $\theta_1, \theta_3, \theta_7, \theta_9$; through the center 0 and through three centers 5, 11, 13 of the centered faces, so $\theta_5, \theta_{11}, \theta_{13}$; and through the center 0 and through six edge centers 2, 4, 6, 8. 10, 12, so $\theta_2, \theta_4, \theta_6, \theta_8, \theta_{10}$ and $\theta_{12}$. In the system CFC there is also determined a number of 13 indirect axes $\theta'_p$: $\theta'_1$ to $\theta'_{13}$ whose indices correspond to the direct axes when they are situated in the prolongation of the direct axes and are symmetrical with the direct axes with respect to the center 0. Thus, in the system CFC there are 26 fixed discrete directions. In the course of the discretization operation 500, any direction $\phi_p$ of the gradient vector $\vec{G}_p$ linked to a current voxel P(x,y,z) of the three-dimensional image is replaced by one of the 26 directions of the axes $\theta_p$ or $\theta'_p$ by selecting the nearest one in space.

At the end of the operation 500, all gradient vectors $\vec{G}_p$ have thus been discretized, i.e. characterized by the co-ordinates x,y,z of the current voxel P(x,y,z) whereto it applies, by its modulus $\|\vec{G}_p\|$ and by a direction $\theta_p$ or $\theta'_p$ from $\theta_1$ to $\theta_{13}$ or from $\theta'_1$ to In the 2-D case: Referring to FIG. 2, the determination of intensity gradients in the two-dimensional image is performed by the means 300 which perform calculations of first-order derivatives of the intensity function I(x,y) in the noisy image along the two co-ordinate axes X,Y of the matrix of the image.

This step can be performed automatically by scanning the image systematically, one pixel after the other, along scanning lines parallel to the axes X,Y by means of an operation 200. In the course of such systematic and automatic scanning, the intensity I(x,y) of the current pixel is subjected to filtering 300 by means of the already described SOBEL filters which are referred to as $SOBEL_x$ for the axis X and $SOBEL_y$ for the axis Y. This filtering operation determines for each pixel a gradient vector $\vec{G}_p$ which is characterized in a next step 400 by its modulus $\|\vec{G}_p\|$ and by the direction $\phi_p$ of its support which is marked in the system of axes X,Y.

Figure 6A:
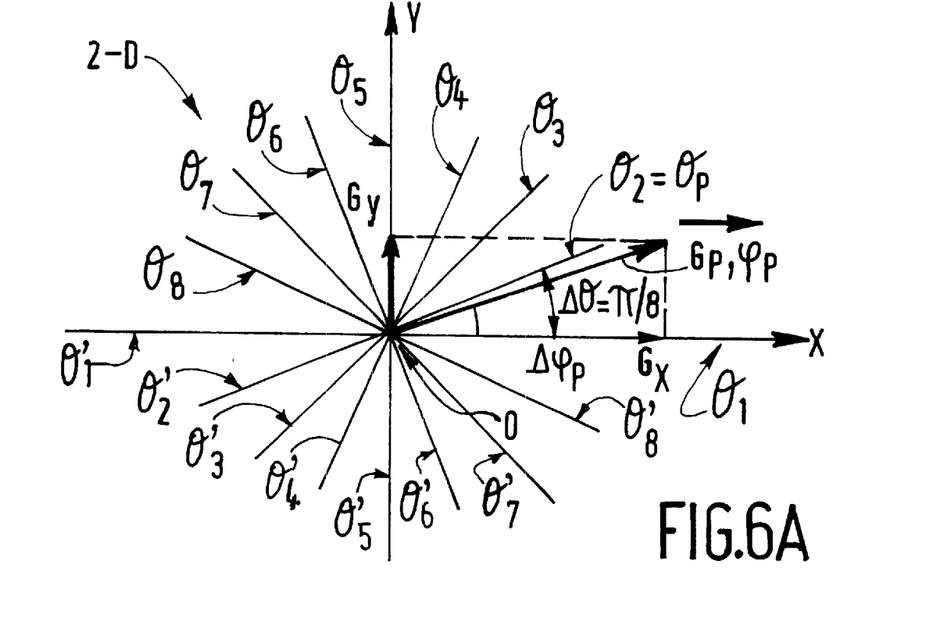
FIG. 6A shows the discretized orientations $\theta_i$ of the gradient vector in the image plane for a two-dimensional image.

As is shown in FIG. 6A, application of the filters $SOBEL_x$ and $SOBEL_y$ yields, along the axes X and Y, components $G_x$ et $G_y$ of the intensity gradient vector $\vec{G}_p$ at the current pixel P(x,y). The calculation of the ratio of these components $G_x$ et $G_y$ yields the value of the tangent of an angle $\phi_p$ enclosed by the gradient vector $\vec{G}_p$ with respect to, for example the axis X taken as a reference. When the sum of the projections of the components $G_x$ et $G_y$ in the direction $\phi_p$ is calculated, the modulus $\|\vec{G}_p\|$ of this vector gradient is also deduced. Thus, in each current pixel P(x,y) the gradient vector is defined by way of the direction $\phi_p$ and its modulus $\|\vec{G}_p\|$. A discretization 500 of the orientation $\phi_p$ of the intensity gradient is subsequently performed in the directions $\theta_p$.

Referring to FIG. 6A, in the case of a two-dimensional (2-D) image the discretization of the directions $\psi_p$ of the supports of the gradient vectors is performed by the means 500 which associate the direction $\psi_p$ of the gradient vector with a fixed discrete direction $\theta_p$ in the two-dimensional orthogonal system X,Y whose center 0 is arranged so as to coincide with the current pixel P(x,y). In this two-dimensional system X,Y, determined a priori and stored in a memory 640, the directions $\theta_p$ extending through 0 are regularly spaced with a pitch $\pi/M$, where M is a constant. For example, the constant M is chosen to be equal to 8 and the angular pitch is $\Delta\theta=\pi/8$. As is shown in FIG. 6A, the direction associated with the modulus of the gradient $\|\vec{G}_p\|$ is then no longer $\theta_p$, but a direction $\theta_p$ or $\theta'_p$ which is the discrete direction chosen nearest to $\phi_p$, for example $\theta_2$. In the case of an angular pitch $\Delta\theta=\pi/8$, the angle of the direction $\theta_p$ or $\theta'_p$ associated with the gradient takes the values: $\theta_1=0$; $\theta_2=\pi/8$; $\theta_3=\pi/4$; $\theta_4=3\pi/8$; $\theta_5=\pi/2$; $\theta_6=5\pi/8$; $\theta_7=3\pi/4$; $\theta_8=7\pi/8$.

3) Smoothing of the Image

Referring to FIG. 2, the smoothing of the image so as to reduce the noise is performed by recursive spatial filtering.

3.a) Scanning of the image to be processed

A system for the automatic scanning of the image is defined a priori. This system is stored, for example in the memory 630. This scanning system offers the advantage that it solves several problems.

Figure 4B:
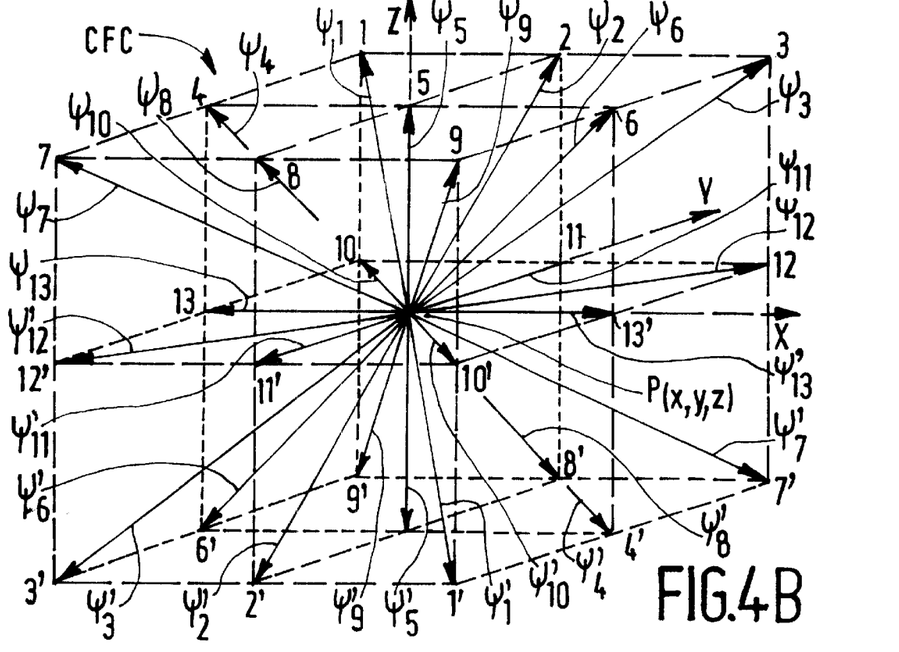
FIG. 4B shows the discretized scanning lines $\psi'_j, \psi_j$ used for filtering the three-dimensional image.
Figure 6B:
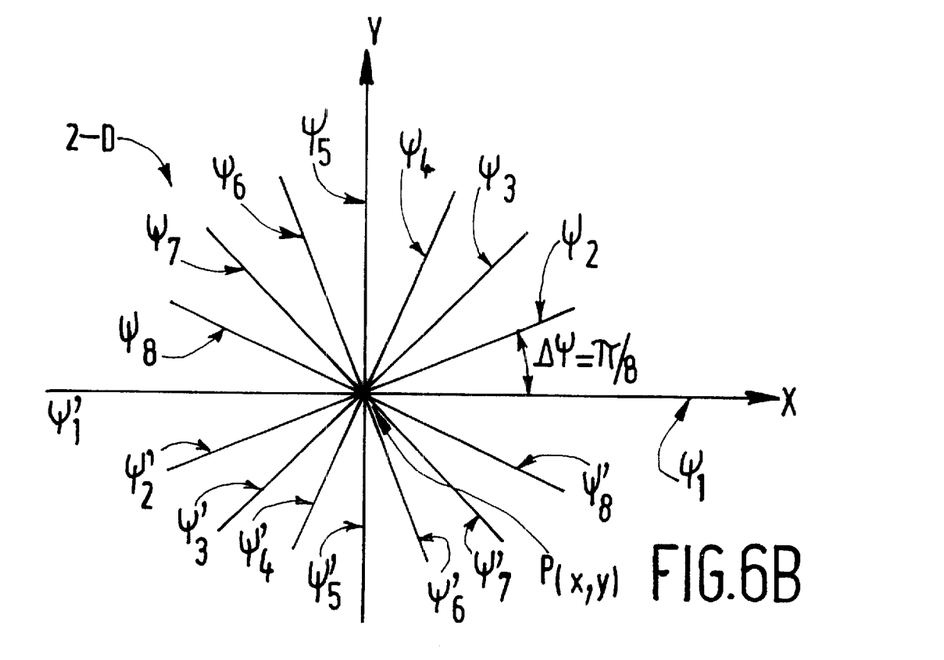
FIG. 6B shows the discretized scanning lines $\psi'_j\psi_j$ used for filtering the two-dimensional image.

In the 3-D and the 2-D case: Referring to the FIGS. 4B and 6B, respectively, the scanning system is defined by the same means as the system for the discretization of the angles of the gradients. Thus, in the 3-D and the 2-D case, sets of directions of scanning lines which are mutually parallel and are denoted as $\psi'_j\psi_j$ are defined in the system CFC and in the image plane. The direction of each set of scanning lines then extends parallel to a respective discrete direction $\theta_j$, $\theta'_j$ of the gradients. Because the discretization directions of the gradients $\theta_j$ and $\theta'_j$ are shifted 180°, the two directions $\theta_j$ and $\theta'_j$ coincide with the same scanning line $\psi'_j\psi_j$. The number of directions of the scanning lines is also chosen to be equal to the number of discretization directions of the gradients, said directions being distributed in space with the same pitch. These sets of scanning lines are followed so as to perform the scanning of the 3-D and 2-D images in such a manner that each voxel or pixel is visited only once so as to undergo the steps of the method. Those skilled in the art will know automatic methods for the scanning of a three-dimensional image and a two-dimensional image. The essential aspect is that the scanning must be systematic and performed in all predetermined directions. Experiments have shown that the order in which the predetermined directions are scanned is irrelevant in respect of obtaining a good result by means of the present method. In order to simplify the drawings these scanning methods are not illustrated.

3.b) Definition of the sampling step on the scanning lines

During an operation 631 the sampling step S of the voxels and pixels on the scanning lines is determined as a function of the orientation of these lines in the system CFC and in the image plane, respectively.

In the 3-D case: When the scanning line extends parallel to a principal axis X,Y,Z of the system CFC, i.e. parallel to an axis of the system CFC which links the center to a vertex of the cube, such as $\psi_{11}$, $\psi_5$ and $\psi_{13}$, the step S=1.

When the scanning line, such as $\psi_2$, extends parallel to an axis of the reference CFC which links the center to the center of an edge of the cube, so a bisector of an angle of 90° enclosed by two principal axes of the system CFC, for example X,Y, the step $S=\sqrt{2}$.

When the scanning line, such as $\psi_3$, extends parallel to an axis of the system CFC which links the center to a vertex of the cube, thus enclosing an angle arctg($1/\sqrt{2}$) with respect to a reference plane of the system CFC, such as the plane (X, Y), the step S=$\sqrt{3}$.

Thus, the step S always has simple values:

S=1, or S=$\sqrt{2}$, or S $\sqrt{3}$.

Figure 5A:
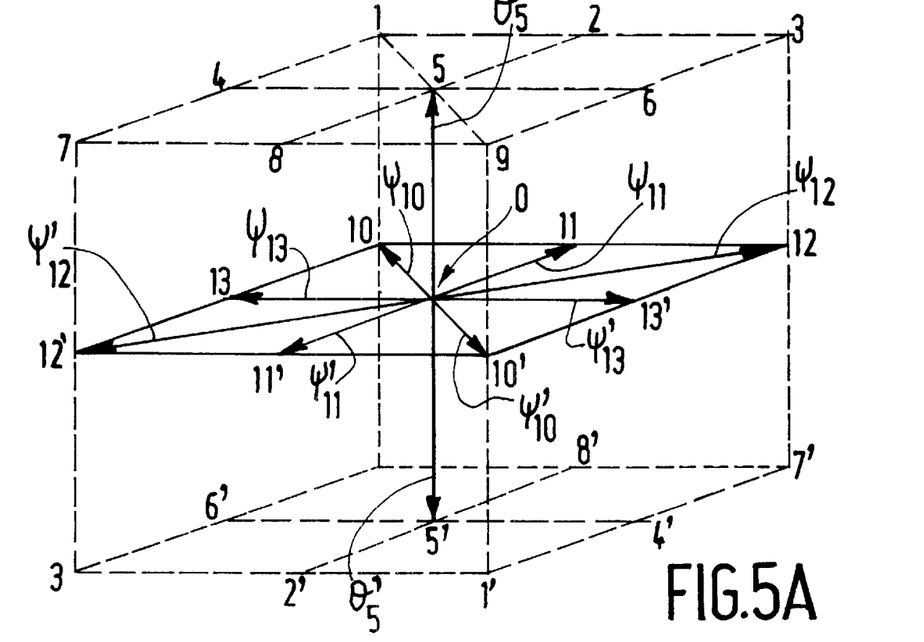
FIGS. 5A, 5B, 5C show the interrelationships between the discretized directions of the gradients and the perpendicular scanning lines for three cases.

Referring to FIG. 5A, it is to be noted that a discretized direction of the gradient which is oriented along a principal axis X, Y or Z admit a perpendicular plane which links the centers of edges parallel to this discretized gradient direction. Thus, the discretized gradient directions $\theta_5$, $\theta'_5$ admit a perpendicular plane 10, 12, 10', 12'. Consequently, four scanning lines perpendicular to $\theta_5$, $\theta'_5$ are possible: $\Psi'_{10}\Psi_{10}$, $\Psi'_{11}\Psi_{11}$, $\Psi'_{12}\Psi_{12}$ and $\Psi'_{13}\Psi_{13}$. Two of these scanning lines, $\Psi'_{11}\Psi_{11}$ and $\Psi'_{13}\Psi_{13}$, extend parallel to the major axes and have a step S=1, and two scanning lines, $\Psi'_{10}\Psi_{10}$ and $\Psi'_{12}\Psi_{12}$, extend parallel to the bisectors-of principal axes and have a step S=1.

Figure 5B:
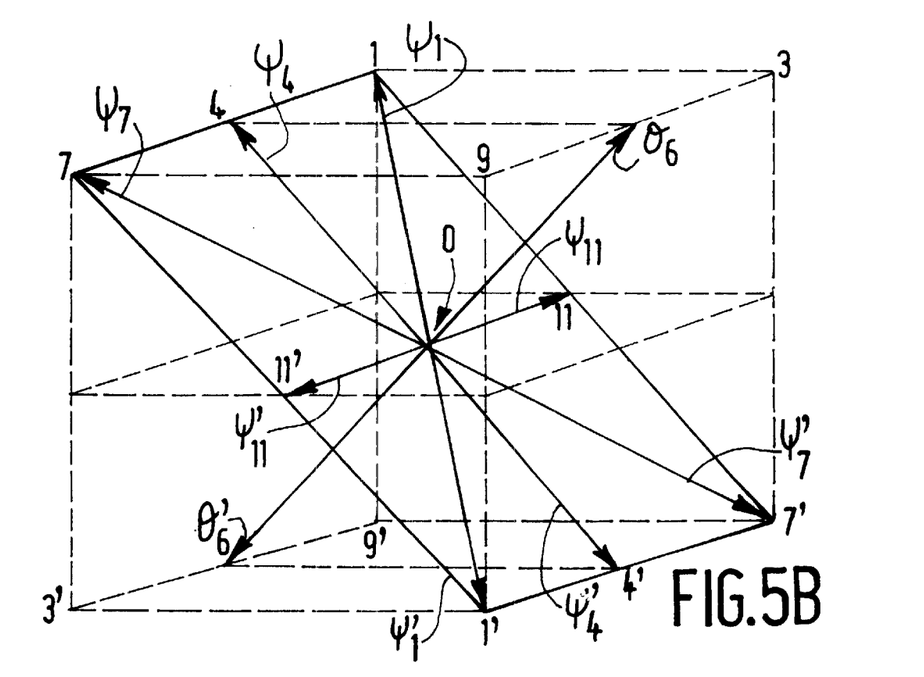

Referring to FIG. 5B, it is to be noted that the discretized gradient directions which link the center 0 to a center of an edge admit a perpendicular plane which links two vertices and two diametrically opposite vertices. Thus, the disretized gradient directions $\theta_6$, $\theta'_6$ admit a perpendicular plane 7, 1, 7', 1'. Consequently, four scanning lines perpendicular to $\theta_6$, $\theta'_6$ are possible: $\Psi'_4\Psi_4$, $\Psi'_{11}\Psi_{11}$, $\Psi'_1\Psi_1$ and $\Psi'_7\Psi_7$. One of these scanning lines, $\Psi'_{11}\Psi_{11}$, extends parallel to the major axes and has a step S=1; one of these scanning lines, $\Psi'_4\Psi_4$, extends parallel to a bisector of major axes and has a step S=$\sqrt{2}$, and two of these scanning lines, $\Psi'_1\Psi_1$ and $\Psi'_7\Psi_7$, enclose an angle of 60° relative to a major axis and have a step S=$\sqrt{3}$.

Figure 5C:
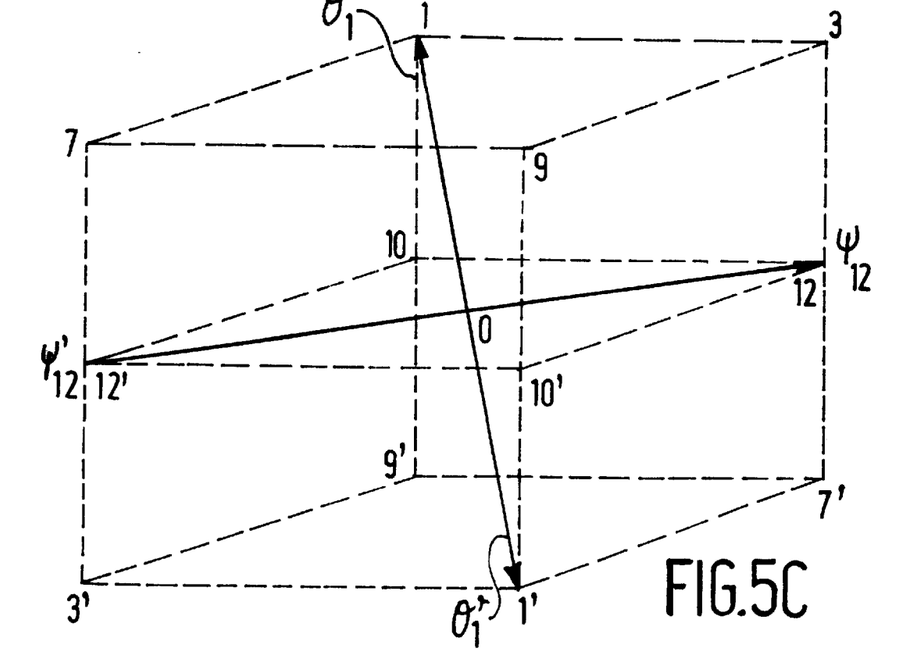

Referring to FIG. 5C, it is to be noted that the discretized gradient directions which link the center 0 to a vertex admit only one perpendicular line which links two centers of opposite edges. Thus, the discretized gradient directions such as $\theta_1$, $\theta'_1$ admit a single possible normal scanning line: $\Psi'_{12}\Psi_{12}$. This scanning line $\Psi'_{12}\Psi_{12}$ is a bisector of the major axes and has a step S=$\sqrt{2}$.

In the 2-D case: When the scanning line extends parallel to a principal axis X,Y of the system of the image plane, i.e. such as $\psi_1$ and $\psi_5$, the step S=1.

When the scanning line, such as $\psi_3$ and $\psi_7$, extends parallel to a bisector of major axes, such as X, Y, so a bisector of an angle of 90°, the step S=$\sqrt{2}$.

When the scanning line encloses an angle of $\pi/8$ relative to the reference axis X, like $\psi_2$ and $\psi_4$, an approximation is carried out by replacing $\pi/8$ by arctg(1/2), so that this scanning line extends through a maximum number of pixels. In that case the step S=$\sqrt{5}$.

Thus, the step S always has simple values:

S=1, or S=$\sqrt{2}$, or S=$\sqrt{5}$. Moreover, each discretized gradient direction admits only a single perpendicular scanning line. All other scanning lines of the system are not perpendicular lines.

In the 3-D and the 2-D case: An advantage offered by this method of defining the scanning system is that it can be simply constructed. Its complexity does not exceed that of the discretization of the gradients.

Another advantage of this scanning system consists in that any discretized gradient direction admits at least one scanning line which is perpendicular thereto.

It is another advantage that the scanning lines can be easily determined so as to ensure that they do not extend through arbitrary points which are difficult to calculate but through a maximum number of voxels or pixels in such a manner that on each scanning line the scanning step, referred to as S, has values that can be simply used.

3.c) Image scanning operation

In the 3-D and the 2-D case: an advantage of the proposed scanning system resides in the fact that it enables simple implementation of the present recursive filtering method applied to the three-dimensional or two-dimensional image. Once this scanning system has been defined, the image is traversed (during an operation 700) in a systematic and automatic direction, i.e. in the two directions of one and the same scanning line: the first direction, for example $\psi_j$, is called the causal direction and the second direction, then being $\psi'_j$, is called the anticausal direction. To this end, the voxels P(x,y,z) or the pixels P(x,y) are numbered with respect to an initial voxel or pixel on the scanning line. The line is scanned from the initial voxel or pixel $u_0$ while passing through the voxels or pixels $u_1, u_2, \ldots u_j$ until the last voxel or pixel $u_n$ is reached in the causal direction, and reciprocally from the voxel or pixel numbered $u_n$ until $u_0$ in the anticausal direction.

Figure 7A:
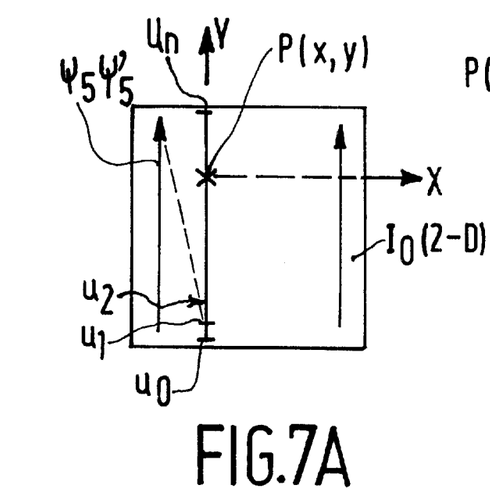
FIGS. 7A and 7B illustrate the causal and anticausal scanning for the filtering of a two-dimensional image.
Figure 7B:
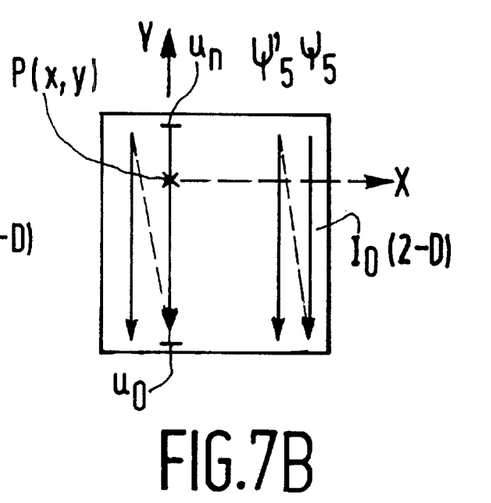

In the 2-D case: By way of example, the FIGS. 7A and 7B illustrate the causal and anticausal scanning, respectively, of a two-dimensional image along the scanning line $\psi_5\psi'_5$ in the plane (X, Y) of the image to be processed These scans are performed in a standard and automatic manner which is known to those skilled in the art.

3.d) Definition of the recursive filtering function

In the 3-D and the 2-D case: The noise suppression is achieved by way of a smoothing 800 of the image during the scanning 700. To this end, the intensity I(x,y,z) or I(x,y) of each current voxel P(x,y,z) or each current pixel P(x,y), respectively, is subjected to a spatial recursive filtering function which is calculated for each voxel or pixel so as to produce a new, smoothed intensity Q(x,y,z) or Q(x,y) at each voxel or pixel. This function performs smoothing of the intensity to a higher degree in the direction perpendicular to the discretized intensity gradient direction relating to this voxel or pixel than in the discretized gradient direction. In other words, for a given voxel or pixel the filtering function produces an impulse response which is much wider in the direction perpendicular to the gradient vector than in the direction of the gradient vector.

In order to smooth and suppress the noise in the image, a recursive spatial processing function is applied to each current pixel $u_j$ during the causal passage in a given scanning direction $\psi_j$, said function being written as:

$$Q^C(u_j)=I(u_j)+\alpha(u_j)[Q^C(u_{j-1})-I(u_j)] \qquad (1)$$

The exponent "C" indicates that the intensity Q is obtained in the causal scan phase. $Q(u_j)$ is the new intensity calculated at the pixel $u_j$ of the scanning line in the causal direction; $Q(u_{j-1})$ is the new intensity calculated at the already scanned pixel $u_{j-1}$ on the line in the causal direction; $I(u_j)$ is the original intensity at the relevant current pixel $u_j$ and $\alpha(u_j)$ is a filtering factor lying between 0 and 1.

Subsequently, during the anticausal scanning on the same scanning line a spatial recursive processing function is applied to the same current pixel $u_j$, be it in the scanning direction which opposes $\psi'_j$, while observing the numbering of the pixels from $u_0$ to $u_n$ determined before the actual scanning step; this function is written as:

$$Q^A(u_j)=Q^C(u_j)+\alpha(u_j)[Q^A(u_{j+1})-Q^C(u_j)] \qquad (2)$$

The exponent "A" indicates that the new intensity Q is obtained in the anticausal phase. It will be recalled that the pixel $u_0$ remains fixed on the line which carries ah and $\psi_j$ and $\psi'_j$, irrespective of the scanning direction.

Thus, the causal passage, in a first direction on a scanning line of given orientation, transforms the original intensity $I(u_j)$ of a current pixel $u_j$ into a new intensity $Q^C(u_j)$ which takes into account the intensity of the adjacent pixel $u_{j-1}$ which has just been scanned and is attributed a new causal intensity $Q^C(u_{j-1})$. Subsequently, the anticausal passage on the same scanning line, in the opposite scanning direction, transforms the intensity $Q^C(u_j)$ just obtained during the causal passage for this pixel, numbered $u_j$, into a new intensity $Q^A(u_j)$ which takes into account the intensity of the adjacent pixel $u_{j+1}$ which has just been scanned and is attributed a new anticausal intensity value $Q^A(u_{j+1})$. The filtering result is stored in 900.

The operation of this smoothing function is analyzed according to the relative positions of the scanning line and of the discretized direction of the gradient at the point scanned.

In a first situation, in which the scanning line does not extend in a plane normal to the discretized direction of the gradient, so-called isotropic filtering is systematically applied; this means that, conceptually speaking, there is defined a kernel of an isotropic filter which has the same dimension in all directions.

In a second situation, in which the scanning line is situated in a plane normal to the discretized direction of the gradient, so-called anisotropic filtering is systematically applied; this means that, conceptually speaking, there is defined a kernel of an anisotropic filter, which kernel has a dimension in the discretized direction of the gradient which is much smaller than that in the plane normal to the discretized direction of the gradient in which the scanning line is situated. In this case a strong gradient occurs if the voxel or pixel scanned is situated on an edge.

This concept is actually the passage, at a given voxel or pixel scanned, of a filter along all scanning lines, said filter having a kernel whose shape and dimensions vary in dependence on the scanning lines, and the combination of the results. During these passages:

the kernel is isotropic for all scanning lines which are not normal to the discretized direction of the gradient at the scanned voxel or pixel. This kernel is anisotropic for a scanning line which is normal to the discretized direction of the gradient at the scanned voxel or pixel.

Figure 8A:
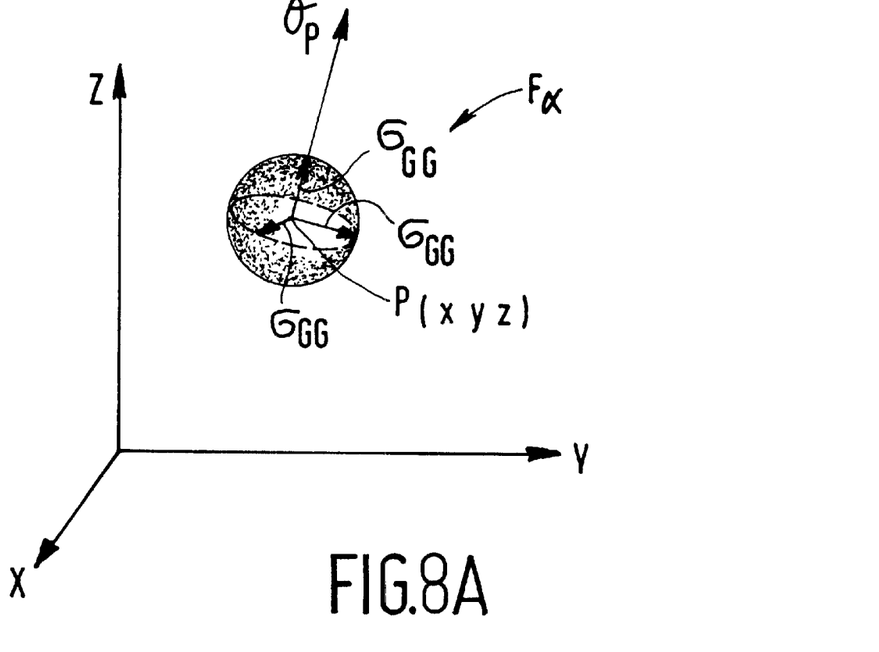
FIGS. 8A and 8B illustrate the kernels of the filters $F_\alpha$ which have variable dimensions and are used to filter a three-dimensional image.
Figure 8B:
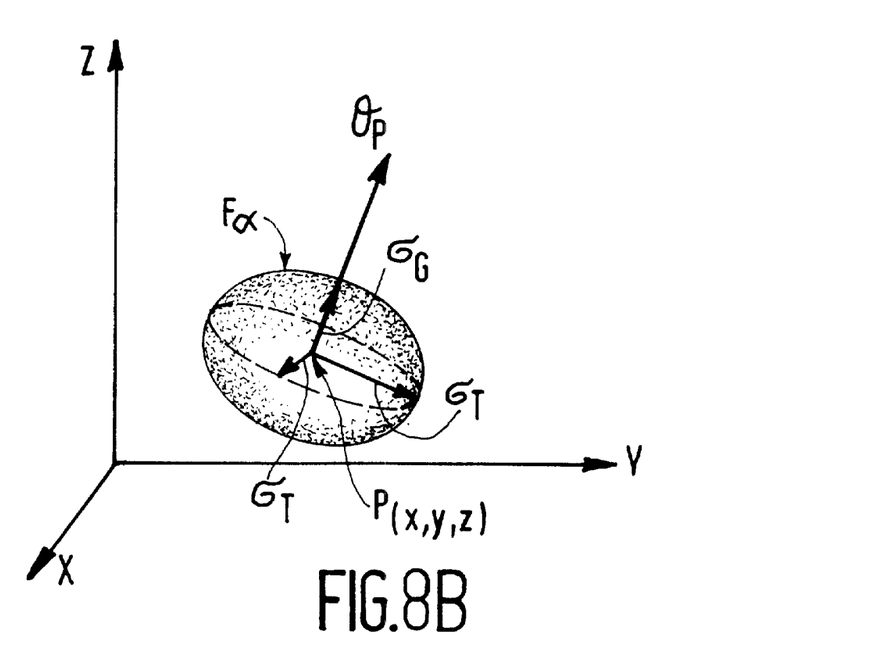

The combination of these passages is equivalent to the passage of a filter having a kernel in the form of a flattened sphere as shown in FIG. 8B whose effective radius in the plane perpendicular to the discretized direction of the gradient is referred to as the equatorial radius $\sigma_T$ and whose radius in the discretized direction of the gradient is referred to as the polar radius $\sigma_G$.

The parameter characterizing the isotropic kernels in the first situation, in which the scanning directions are not normal to the discretized direction of the gradient, is referred to as the isotropic kernel radius $\sigma_{GG}$. FIG. 8A shows an isotropic kernel having a spherical shape.

When the intensity gradient appears to be very small, practically zero, the dimensions or parameters of the anisotropic filter diminish and become identical, in all directions, to a basic parameter $\sigma_0$.

3.e) Determination of the parameters of filter kernels

This operation determines, on the basis of the basic parameter $\sigma_0$, the values of the parameters of kernels of filters, called $\sigma_T$ for the effective radius of the anisotropic kernel in the plane normal to the discretized direction of the gradient, and called $\sigma_{GG}$ for the isotropic kernels on the scanning lines which are not normal to the discretized direction of the gradient.

Figure 3A:
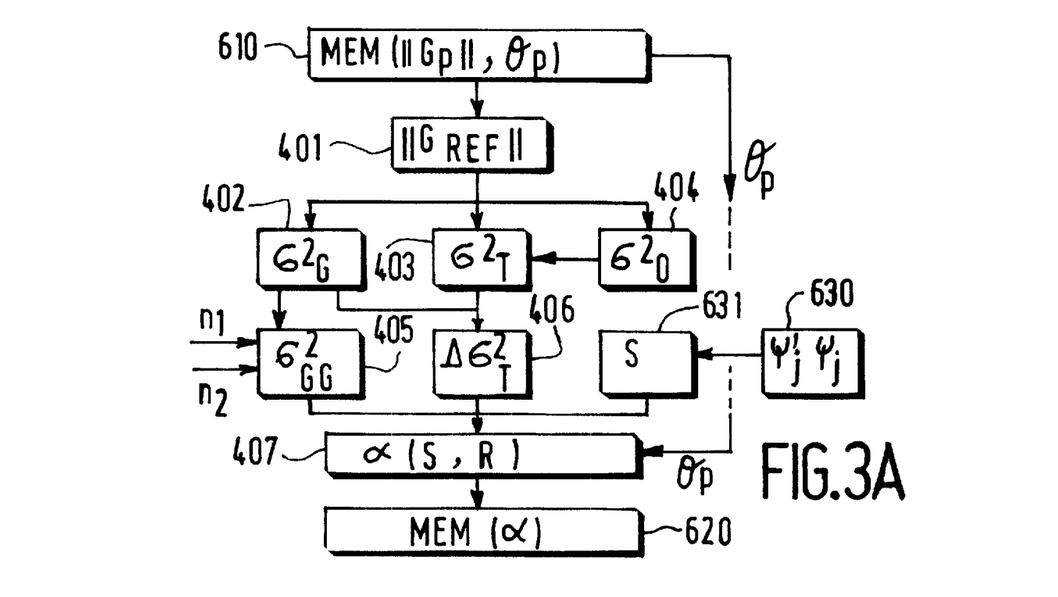
FIG. 3A shows blocks representing the general steps for determining the smoothing factor α.

Referring to FIG. 3A, an operation 401 defines a value which is called a reference gradient $\|\vec{G}_{REF}\|$, being the value of the gradient below which it is declared a priori that the corresponding pixel does not belong to an edge, i.e. below which the gradient is considered to be sufficiently weak so as to use the isotropic filter whose kernel has the basic parameter $\sigma_0$ as its radius. Above this value the corresponding pixel is declared to belong to an edge and the anisotropic kernel filter is applied. An edge is to be understood to mean a zone of the image which exhibits an intensity transition such as the transition between an object and the background.

In order to determine $\|\vec{G}_{REF}\|$, from among the gradients stored, for example in the memory 610, there is taken the highest value found which is denoted as $\|\vec{G}_{MAX}\|$, and the value of $\|\vec{G}_{REF}\|$ is fixed to be small in comparison with that of $\|\vec{G}_{MAX}\|$. For example:

$$\|\vec{G}_{REF}\| = \|\vec{G}_{MAX}\|/10 \text{ or } \|\vec{G}_{REF}\| = \|\vec{G}_{MAX}\|/20$$

Referring to the FIGS. 8A, 8B and 8A, an operation 404 subsequently defines the basic parameter $\sigma_0$ and the operations 402, 403 and 406 are carried out to determine relations between the basic parameter $\sigma_0$ and the radii $\sigma_T$ and $\sigma_G$ of the anisotropic kernel:

$$\sigma_G^2 = \frac{\sigma_0^2}{\left(1 + \frac{\|\vec{G}_P\|^2}{\|\vec{G}_{REF}\|^2}\right)^2} \quad (3)$$

$$\sigma_T^2 = \frac{\sigma_0^2}{1 + \frac{\|\vec{G}_P\|^2}{\|\vec{G}_{REF}\|^2}} \quad (4)$$

The degree of anisotropy $\Delta\sigma_T$ is linked to the polar and equatorial radii of anisotropic kernels by the relation:

$$\Delta\sigma_T^2 = \sigma_T^2 - \sigma_G^2 \quad (5)$$

Via the operation 405, from the polar radius and its square there is also derived the parameter $\sigma_{GG}$ which characterizes the isotropic filtering kernel when the scanning line is not normal to the discretized direction of the gradient:

$$\sigma_{GG}^2 = \frac{n_1 \sigma_G^2}{n_2} \quad (6a)$$

where $n_1$ is the number of dimensions of the image processed, and where $n_2$ is the number of scanning lines.

In the 3-D case:

$$\sigma_{GG}^2 = \frac{3\sigma_G^2}{13} \quad (6b)$$

the 3-D image having 3 dimensions and 13 scanning lines $\psi_1$ to $\psi_{13}$.

In the 2-D case:

$$\sigma_{GG}^2 = \frac{2\sigma_G^2}{8} \quad (6c)$$

the image having 2 dimensions and 8 scanning lines $\psi_1$ to $\psi_8$.

3.f) Determination of the smoothing factor $\alpha$

In the 3-D and the 2-D case: referring to FIG. 3A, the factor $\alpha(u_j)$, referred to hereinafter as the smoothing factor α, is defined by the operation 407 so as to provide smoothing to a degree which is higher in the direction perpendicular to the discretized direction of the intensity gradient vector than in the discretized direction of this intensity gradient vector. The smoothing factor α is chosen on the one hand as a function of the discretized direction $\theta_p$ of the gradient vector $\vec{G}_p$ and as a function of the step S of the voxels or pixels on the scanning line $\psi_j$, $\psi_j$. The smoothing factor α on the other hand is chosen as a function of the modulus of the intensity gradient $\|\vec{G}_p\|$ at the current voxel P(x,y,z) or pixel P(x,y).

In the 3-D and the 2-D case: the intensity characteristics I(x,y,z) or I(x,y) and the gradients at each voxel P(x,y,z) or pixel P(x,y) are first stored, for example in a memory 610, and associated with the co-ordinates in such a manner that:

In the 3-D case: I(x,y,z), θ among $\theta_1$ to $\theta_{13}$, or $\theta'_1$ to $\theta'_{13}$, and $\|\vec{G}_p\|$ correspond to x, y, z for the three-dimensional image.

In the 2-ID case: for the two-dimensional image I(x,y), θ among $\theta_1$ to $\theta_8$, or $\theta'_1$ to $\theta'_8$, and $\|\vec{G}_p\|$ correspond to x,y.

Figure 3B:
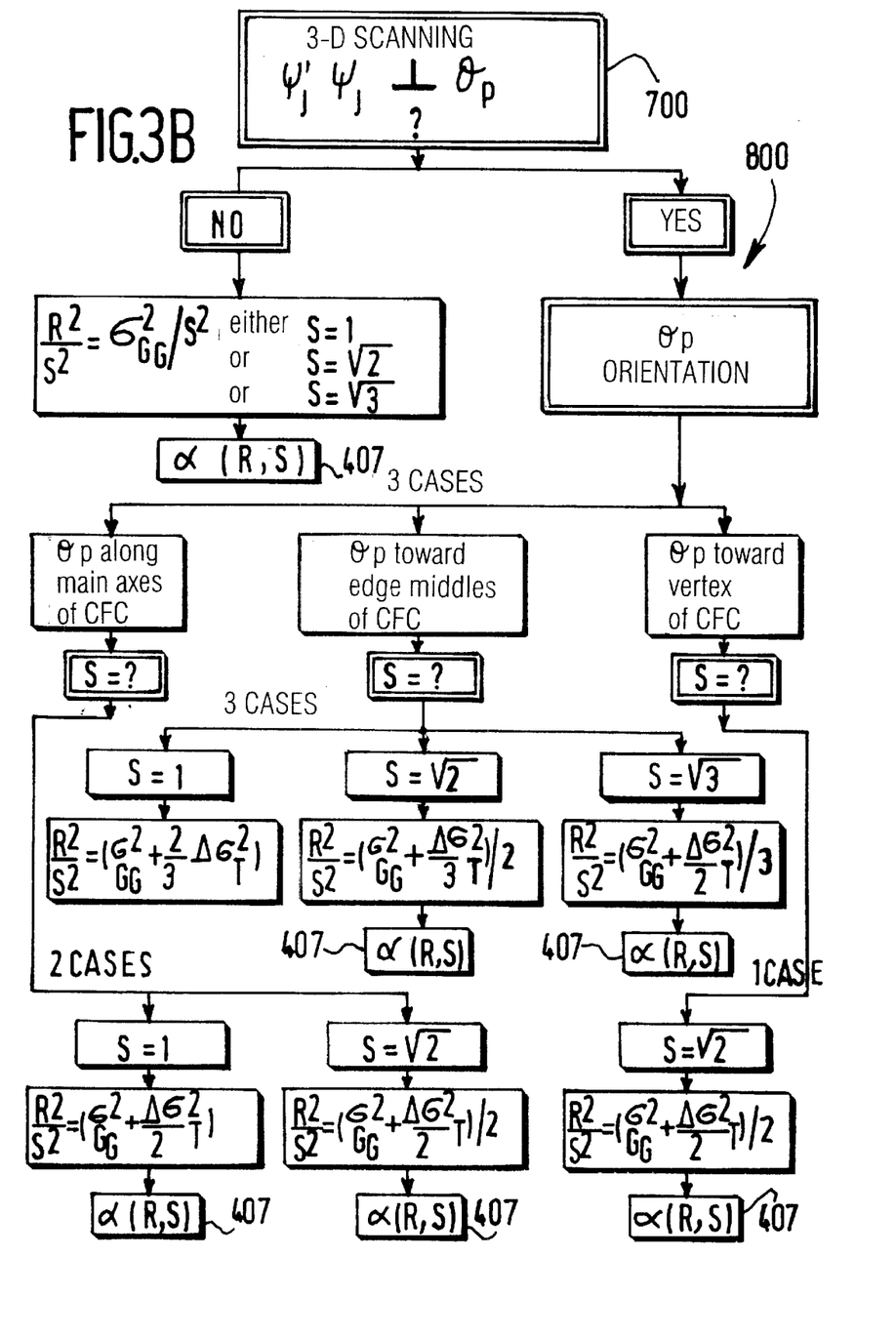
FIGS. 3B and 3C illustrate the determination of the smoothing factor α in detail for the processing of a three-dimensional image and a two-dimensional image, respectively.
Figure 3C:
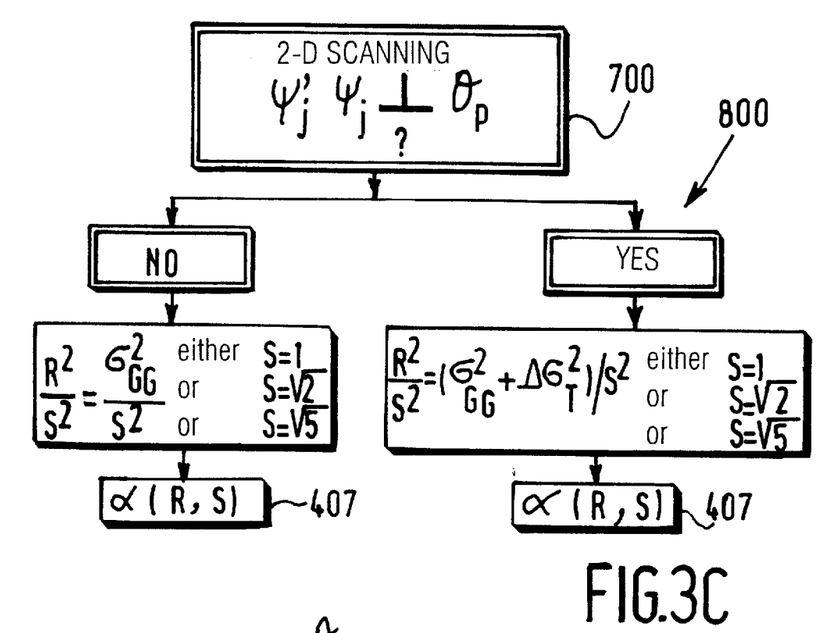

In the 3-D and the 2-D case: finally, the operation 407 produces the factor α by way of the relation (7), as can be deduced by those skilled in the art from a calculation of moments relating to an infinite impulse response, based on the hypothesis that the gradient varies slowly:

$$\alpha = 1 + \frac{S^2}{R^2} - \sqrt{\left(1 + \frac{S^2}{R^2}\right)^2 - 1} \quad (7)$$

contained between 0 and 1, where S is the sampling step of the voxels or pixels along the scanning lines. R is a factor calculated as a function of the polar and equatorial radii of the anisotropic filter $\sigma_G$ and $\sigma_T$, as a function of the direction $\theta_p$ of the gradient vector $\vec{G}_p$ with respect to the scanning line $\psi_j$ and also as a function of the previously defined sampling step S. Referring to the FIGS. 3B and 3C, the determination of the smoothing factor α thus consists of the determination of the factor R which defines the anisotropic kernel used for each passage during the scanning of the image. To this end, the ratio $R^2/S^2$ is determined. Such a determination takes place in the two situations encountered during the scanning of the image.

In the 3-D case: (FIG. 3B) first situation: at a given voxel, P(x,y,z), the scanning line $\psi_j$ is not normal to the discretized direction $\theta_p$ of the gradient vector $\vec{G}_p$. In the formule of α (7), there is written: $R^2/s^2 = \sigma_{GG}^2/S^2$.

Second situation at a given voxel, P(x,y,z), the scanning line $\psi_j$ is normal to the discretized direction of the gradient vector $\vec{G}_p$ whose discretized orientation $\theta_p$ is still to be taken into account according to three cases:

In the first case, where $\theta_p$ is parallel to a principal axis X,Y,Z of the system CFC (and $\vec{G}_p$ is perpendicular to $\psi_j$), there is written:

$$R^2/S^2 = \left(\sigma_{GG}^2 + \frac{\Delta\sigma_T^2}{2}\right)/S^2$$

In the second case, where $\theta_p$ extends parallel to a bisector of two principal axes of the system CFC, and hence parallel to an axis which links the center 0 to the center of an edge while enclosing an angle of 45° with respect to a principal axis (with $\vec{G}_p$ perpendicular to $\psi_j$), and also:

if S=1, there is written: $R^2/S^2 = (\sigma_{GG}^2 + 2/3\Delta\sigma_T^2)$ or if S=√2, there is written:

$$R^2/S^2 = \left(\sigma_{GG}^2 + \frac{\Delta\sigma_T^2}{3}\right)/2$$

or if S=√3, there is written:

$$R^2/S^2 = \left(\sigma_{GG}^2 + \frac{\Delta\sigma_T^2}{2}\right)/3$$

The coefficients applied to the parameter $\Delta\sigma_T$ are intended to ensure that its contribution is ultimately assigned a coefficient 1 after the realization of the 13 combinations.

In the third case, where $\theta_p$ extends parallel to an axis of the system CFC which links the center to a vertex of the cube (which case occurs exclusively if S=√2) there is written: $R^2/S^2 = (\sigma_{GG}^2 + 2/3\Delta\sigma_T^2)/2$ In the 2-D case (FIG. 3C): during the processing of a two-dimensional image, the filter kernel is simply a flattened circle having a major radius $\sigma_T$ in the direction perpendicular to the discretized direction of the gradient vector and a minor radius $\sigma_G$ in the discretized direction of the gradient vector. A single scanning line extends perpendicularly to the discretized direction of the gradient.

First situation: at a given pixel, P(x,y), the scanning line $\psi'_j\psi_j$ is not normal to the discretized direction $\theta_p$ of the gradient vector $\vec{G}_p$. In the formule of α (7) there is written:

$$R^2/_s^2 = \sigma_{GG}^2/S^2$$

Second situation: at a given pixel, P(x,y), the scanning line $\psi'_j\psi_j$ is normal to the discretized direction of the gradient vector $\vec{G}_p$. The step S on the scanning line is still to be taken into account.

In the first case, in which the discretized direction of the gradient $\theta_p$ is perpendicular to a scanning line $\psi'_j\psi_j$ parallel to a principal axis X,Y of the image, where S=1, there is written:

$$R^2/S^2 = \left(\sigma_{GG}^2 + \frac{\Delta\sigma_T^2}{2}\right)/S^2.$$

In the second case, in which the discretized direction of the gradient $\theta_p$ is perpendicular to a scanning line $\psi'_j\psi_j$ parallel to a bisector of two principal axes of the image while enclosing an angle of 45° with respect to a principal axis, in which case S=√2, there is written:

$$R^2/S^2 = \left(\sigma_{GG}^2 + \frac{\Delta\sigma_T^2}{3}\right)/2$$

In the third case, in which the discretized direction of the gradient $\theta_p$ is perpendicular to a scanning line with a step S=√5, there is written:

$$R^2/S^2 = \left(\sigma_{GG}^2 + \frac{\Delta\sigma_T^2}{3}\right)/5.$$

The values of α are then calculated by means of the relation (7) and stored in 620 for the calculation of the functions (1) and (2).

APPARATUS

Figure 9:
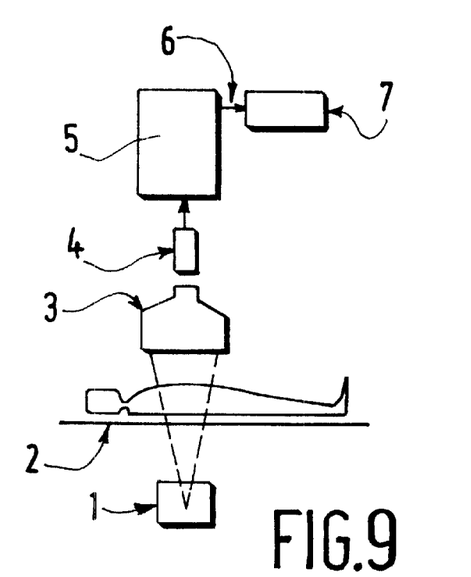
FIG. 9 shows an X-ray apparatus which includes means for carrying out an image processing method.

By way of example, FIG. 9 shows a medical imaging apparatus which includes a digital radiography system with means for carrying out the described noise-reduction method. The apparatus includes an X-ray source 1, a table 2 for accommodating the patient, a receiving device for the X-rays having traversed the patient, and notably an image intensifier device 3 which is coupled to a camera tube 4 which applies data to a data image processing system 5 which includes a microprocessor. The microprocessor comprises several outputs, one output 6 of which is coupled to a monitor 7 for the display of images or sequences of images processed or to be processed.

The digital two-dimensional radiographic image may comprise $512^2$ or $1024^2$ pixels encoded on 8 bits or 10 bits. Each pixel can thus be assigned one from among 256 or 1024 intensity levels. For example, the dark regions have a low intensity level and the bright regions of the image have a high intensity level. The digital three-dimensional radiographic image may contain $128^3$ voxels.

The digital image can be acquired in the fluoroscopy mode. The invention can be used particularly for the processing of arteriographic images. The various steps and operations involved in the digital image processing by means of the described method are carried out in the system 5. The data can be stored in a memory zone (not shown). Recording means (not shown) may also be used.

All references cited herein are incorporated herein by reference in their entirety and for all purposes to the same extent as if each individual publication or patent or patent application was specifically and individually indicated to be incorporated by reference in its entirety for all purposes.

What is claimed is:

1. An image processing method for preserving the edges of objects reproduced in an intensity image and for reducing the noise, including the steps of:

acquisition of the intensity image in the form of a multidimensional matrix of points, determination of the intensity gradient at each point, defined by its direction ($\theta^P$) and its modulus ($\|G^P\|$), passage at each point of a recursive spatial filter having an anisotropic kernel and providing a degree of smoothing which is greater in the direction perpendicular to the direction of the gradient than in the direction of the intensity gradient.

2. A method as claimed in claim 1, including the following sub-steps:

discretization of the directions ($\theta_p$) of the intensity gradients in a first system which consists of a number N of centered axes, automatic scanning of the image according to a second system comprising the same number N of centered lines ($\Psi'_j, \Psi_j$) which extend parallel to the directions of the first system of axes, respectively, and also in such a manner that each discretized gradient direction ($\theta_p$) of the first system admits a number, smaller than N, of scanning lines which are not perpendicular and a complementary number, equal to or larger than 1, of perpendicular scanning lines, definition of a filter with a variable kernel, including a first set of sub-filters having identical isotropic kernels which are applied to the current point on the scanning lines of the second system which are not perpendicular to the discretized direction of the gradient, and a second set of sub-filters having anisotropic kernels which are applied to the current point on the scanning lines of the second system which are perpendicular to the discretized direction of the gradient, and combination of the N results of the N sub-filters in order to produce the result of the recursive spatial filter.

3. A method as claimed in claim 2 wherein the recursive spatial filtering further comprises the evaluation, at each current point on each scanning line, of a recursive spatial filtering function which includes a first passage in a causal direction and a second passage in an anticausal direction, with an evaluation of the filtered intensity ($Q_j$) at the current pixel (j) upon each passage as a linear combination of the intensity ($I_j$) previously existing at the current pixel and of the difference between the filtered intensity at the adjacent pixel and existing previously at the current pixel, attenuated by a factor ($\alpha$) which is called the smoothing factor ($0<\alpha<1$).

4. A method as claimed in claim 3, in which the image is three-dimensional and in which the discretization systems for the orientations of the gradients ($\theta_p$) and the scanning lines ($\Psi'_j, \Psi_j$) comprise 13 centered axes which are the axes of a centered cubic system with centered faces and edges (CFC).

5. A method as claimed in claim 3, in which the image is two-dimensional and in which the systems for the discretization of the orientations of the gradients ($\theta_p$) and the scanning lines ($\Psi'_j, \Psi_j$) comprise 8 centered axes which are regularly distributed in the image plane.

6. A method as claimed in 3, of:

evaluation of a basic parameter ($\sigma_0$) having the dimension of an isotropic filtering kernel for filtering a zone of the image with a gradient substantially equal to zero ($\|\vec{G}_p\| \approx 0$), evaluation of parameters of dimensions ($\sigma_G, \sigma_T$) of the anisoptropic kernel of sub-filters applied perpendicularly to a discretized direction of the gradient, and of the parameter of dimension ($\sigma_{GG}$) of the isotropic kernel of sub-filters applied along scanning lines which are not perpendicular to the discretized direction of the gradient, and of the contribution to the anisotropy ($\Delta\sigma_T$) as a function of the basic parameter ($\sigma_0$) and of the modulus of the gradient ($\|\vec{G}_p\|\neq 0$).

evaluation of a dimension parameter (R) which defines the anisotropic kernel used for each passage as a function of the contribution to the anisotropy ($\Delta\sigma_T$) and of the dimension parameter of the isotropic kernels ($\sigma_{GG}$), and evaluation of the smoothing factor ($\alpha$) as a function of the dimension parameter (R) of said anisotropic filter kernel used for each passage.

7. A method as claimed in claim 6, in which the isotropic kernels are spheres and in which the anisotropic kernels are flattened spheres whose largest dimensions extend perpendicularly to the discretized direction of the gradient.

8. A method as claimed in claim 3, of:

evaluation of a sampling step (S) on all scanning lines, and evaluation of the smoothing factor as a function of said sampling steps.

9. A method as claimed in claim 3, of the filtered intensity at a given pixel as the combination of intensities filtered along all scanning lines.

10. A medical imaging apparatus which includes means for reducing the noise in a noisy digital medical image, a system for the acquisition of an intensity image in the form of a multidimensional matrix of points, and an image processing system which has access to the image data and to an image display system and which includes a microprocessor for carrying out a method as claimed in claim 1.

11. The method of claim 6 wherein the recursive spatial filtering further comprises:

evaluation of a sampling step (S) on all scanning lines, and evaluation of the smoothing factor as a function of said sample steps.

12. The method of claim 6 wherein the recursive spatial filtering further comprises evaluation of the filtered intensity at a given pixel as the combination of intensities along all scanning lines.

13. The method of claim 8 wherein the recursive spatial filtering further comprises evaluation of the filtered intensity at a given pixel as the combination of intensities along all scanning lines.

\* \* \* \* \*